(12) United States Patent
Ye

(10) Patent No.: US 10,496,880 B2
(45) Date of Patent: Dec. 3, 2019

(54) METHOD AND APPARATUS FOR COMPARING OBJECTS IN IMAGES

(71) Applicant: CANON KABUSHIKI KAISHA, Tokyo (JP)

(72) Inventor: Getian Ye, Kogarah (AU)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 15/634,499

(22) Filed: Jun. 27, 2017

(65) Prior Publication Data

US 2018/0373929 A1 Dec. 27, 2018

(51) Int. Cl.
*G06K 9/00* (2006.01)
*G06K 9/46* (2006.01)

(52) U.S. Cl.
CPC ..... *G06K 9/00442* (2013.01); *G06K 9/00771* (2013.01); *G06K 9/4604* (2013.01); *G06K 9/4642* (2013.01); *G06K 2009/4666* (2013.01)

(58) Field of Classification Search
None
See application file for complete search history.

(56) References Cited

U.S. PATENT DOCUMENTS

2004/0073543 A1* 4/2004 Kim .................. G06F 16/583
2010/0328452 A1* 12/2010 Jung .................. G06K 9/6206
348/135
2015/0278580 A1 10/2015 Sato
2016/0012296 A1 1/2016 Xing
2016/0155020 A1 6/2016 Tariq
2018/0075318 A1* 3/2018 Chu .................. G06T 7/0002

OTHER PUBLICATIONS

Delac, K. et al., 'Appearance-based Statistical Methods for Face Recognition', Jun. 8, 2005, pp. 151-158, 47th International Symposium ELMAR-2005, Zadar, Croatia.
Ergin, S. et al., 'A Novel Framework for Partition-Based Face Recognition', International Journal of Innovative Computing, Information and Control (ICIC), May 2013, pp. 1819-1834, vol. 9, No. 5, Publisher: Tokai University, Kumamoto, Japan.
Ma, Andy J.. Cross-Domain Person Reidentification Using Domain Adaptation Ranking SVMs. Journal. May 2015. pp. 1599-1613. vol. 24. IEEE Transactions on Image Processing, Charlottesville, VA.
Peng, Peixi. Unsupervised Cross-Dataset Transfer Learning for Person Re-identification. Journal. Jun. 2016. pp. 1306-1315. vol. 26. In Proceedings of the IEEE Conference on Computer Vision and Pattern Recognition (CVPR).
Gretton, Arthur. A Kernel Two-Sample Test. Journal. Mar. 2012. pp. 723-773. vol. 13. Journal of Machine Learning Research.

(Continued)

*Primary Examiner* — Vikkram Bali
(74) *Attorney, Agent, or Firm* — Canon U.S.A., Inc. IP Division

(57) ABSTRACT

A method of comparing objects in images. A dictionary determined from a plurality of feature vectors formed from a test image and codes formed by applying the dictionary to the feature vectors is received, the dictionary being based on a difference in mean values between the codes. Comparison codes are determined for the objects in the images by applying the dictionary to feature vectors of the objects in the images. The objects in the images are compared based on the comparison codes of the objects.

17 Claims, 7 Drawing Sheets

(56) References Cited

OTHER PUBLICATIONS

Smola, Alex. A Hilbert Space Embedding for Distributions. Journal. 2007. pp. 1-20. vol. 4754. Algorithmic Learning Theory (ALT). Lecture Notes in Computer Science. Springer, Heidelberg, Berlin.

Pan, Sinno Jialin. Domain Adaptation via Transfer Component Analysis. Journal. Feb. 2011. pp. 199-210. vol. 22. IEEE Transactions on Neural Networks.

Zhang, Li. Learning a Discriminative Null Space for Person Re-identification. Journal. Mar. 2016. pp. 1239-1248. In Proceedings of the IEEE Conference on Computer Vision and Pattern Recognition.

Zheng, Miao. Graph Regularized Sparse Coding for Image Representation. May 2011. pp. 1327-1336. vol. 20, No. 5. IEEE Transactions on Image Processing.

Lisanti, Giuseppe. Matching People Across Camera Views Using Kernel Canonical Correlation Analysis. Nov. 2014. Article No. 10. In Proceedings of the International Conference on Distributed Smart Cameras (ICDSC). Association for Computing Machinery (ACM).

\* cited by examiner

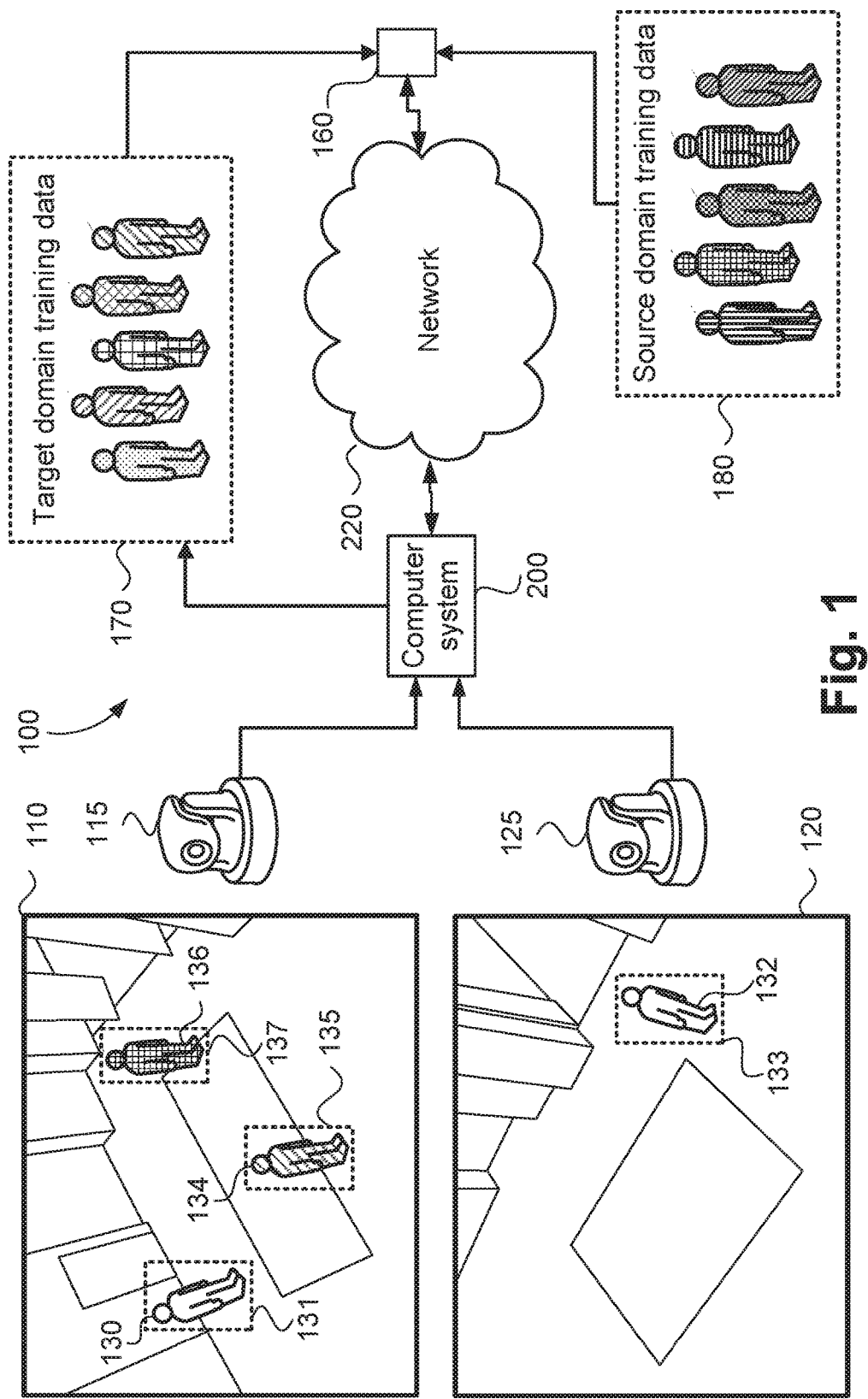

METHOD AND APPARATUS FOR COMPARING OBJECTS IN IMAGES

TECHNICAL FIELD

The present invention relates generally to image processing and, in particular, to matching objects between two captured images to determine whether a candidate object is an object of interest. The present invention also relates to a method, apparatus and system for comparing objects in images captured from two cameras, and to a computer program product including a computer readable medium having recorded thereon a computer program for comparing objects in images captured from two cameras.

DESCRIPTION OF THE RELATED ART

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view any video feed containing a particular suspicious person in order to identify undesirable activities. In another example from the business analytics domain, a shopping centre may wish to track customers across multiple cameras in order to build a profile of shopping habits.

Many surveillance applications require methods, known as "video analytics", to detect, track, match and analyse multiple objects of interest across multiple camera views. In one example, referred to as a "hand-off" application, object matching is used to persistently track multiple objects across first and second cameras with overlapping fields of view. In another example application, referred to as "re-identification", object matching is used to locate a specific object of interest across multiple cameras in the network with non-overlapping fields of view.

Cameras at different locations may have different viewing angles and work under different lighting conditions, such as indoor and outdoor. The different viewing angles and lighting conditions may cause the visual appearance of a person to change significantly between different camera views. In addition, a person may appear in a different orientation in different camera views, such as facing towards or away from the camera, depending on the placement of the camera relative to the flow of pedestrian traffic. Robust person matching in the presence of appearance change due to camera viewing angle, lighting and person orientation is a challenging problem.

In most person matching methods, the appearance of a person is represented by a "descriptor", also referred to as an "appearance descriptor" or "feature vector". A descriptor is a derived value or set of derived values determined from the pixel values in an image of a person. One example of a descriptor is a histogram of colour values. Another example of a descriptor is a histogram of quantized image gradient responses.

In some known methods for person matching, a "dictionary" is used to encode a compact, discriminative representation of an appearance descriptor. A dictionary consists of a set of dictionary "atoms" or basis vectors. An appearance descriptor of a person can be reconstructed as a linear weighted sum of dictionary atoms, each atom being weighted by a coefficient. The coefficients for all dictionary atoms collectively form an "encoding" or "comparison code". Given an appearance descriptor, the corresponding encoding is determined by finding the weighted sum of dictionary atoms that minimizes a difference, known as a "reconstruction error", between the appearance descriptor and a reconstruction of the appearance descriptor using the dictionary.

In some known methods for person matching, known as "dictionary learning", the dictionary is learned from pairs of images of people captured from a pair of cameras. In each pair of images, the first image is captured from the first camera and the second image is captured from the second camera. Pairs of images of the same person are known as "positive" training samples. Pairs of images of different people are known as "negative" training samples. In one known method, known as "supervised learning", dictionary learning is provided with information related to whether the image pairs are positive or negative training samples. In this arrangement, the image pairs are known as "labelled" training samples. In another method, known as "unsupervised learning", dictionary learning is not provided with information related to whether the image pairs are positive or negative training samples. In the unsupervised learning method, the image pairs are known as "unlabelled" training samples. In yet another method, known as "semi-supervised learning", dictionary learning is provided with a mix of labelled and unlabelled training samples.

In some known methods for person matching based on dictionary learning, a pair of images is matched as follows. Firstly, an appearance descriptor is extracted for each image. Then, each appearance descriptor is encoded as a comparison code using the learned dictionary. Finally, a dissimilarity is determined between the comparison codes. One example of a dissimilarity is the Euclidean distance between the comparison codes. If the dissimilarity is sufficiently small, the images are determined to match.

In dictionary learning, the atoms in the learned dictionary represent particular aspects of appearance, and are specific to the camera viewing angle, lighting conditions, person orientation and clothing that characterize the training images. Typically, a dictionary is learned from pairs of training images captured from the same pair of cameras in which people are to be matched. In practice, however, generating a set of labelled training images is time consuming and requires intense manual labour. Furthermore, people may appear infrequently in some camera views, such as remote perimeters, making the collection of a large set of labelled or unlabelled training images impractical. Therefore, methods resort to learn a dictionary without the need to capture large quantities of training data in every pair of cameras.

The dictionary learned from a training dataset often perform very poorly on a dataset collected under a new environment, e.g., an airport, which is different from the environment where the training dataset is collected, e.g., a city centre. The differences in lighting conditions, camera view angles, person orientations, and camera sensor characteristics introduce a significant change in the distribution of appearance descriptors. Hence the distributions of appearance descriptors from two different environments are significantly different. This problem is known as the domain shift problem and usually causes a significant degradation in the performance of a person re-identification system when the system is deployed to a new environment. The domain shift problem also exists in the same surveillance system installed at the same location. For example, the training dataset is collected in summer and the system is required to work in winter. The seasonal change introduces a significant change in the distribution of appearance descriptors. The environment where training data is collected is called source domain or training domain and the environment where the system is deployed is called target domain.

One known method to solve the problem of domain shift is to capture unlabelled training data in the target domain and use multiple dictionaries to model the similarities and differences between the appearance of people in the source and target domains. In the method, a shared dictionary represents characteristics of appearance that are common to the source and target domain, and an independent residual dictionary for each domain represents the characteristics of appearance unique to each domain. Furthermore, a target dictionary represents characteristics of appearance in the target domain that are not captured by the shared dictionary or residual dictionaries. However, using multiple dictionaries to model the similarities and differences requires a large amount of training data in the target domain to robustly train the residual and target dictionaries in the target domain. Capturing a large training set may not be possible if the target domain is sparsely populated.

Another known method for domain adaptation is to capture labelled training data in the target domain, and learn a transformation that aligns the feature distributions between the source domain and target domain in a common subspace. The method learns a pair of linear projections that transform appearance descriptors from the source domain and target domain respectively to a subspace, wherein the mean distance between the average projected source domain feature and target domain feature is minimized Simultaneously, each projection is constrained so that the resulting subspace preserves the metric structure of the original feature space; that is, features that were close together in the original feature space are close in the subspace. A common dictionary representing the appearance characteristics of the aligned source and target domain data is then learnt. However, a large amount of training data is required in the target domain to learn a subspace projection. Further, the model has many parameters to learn, including a two subspace projections, a dictionary and multiple regularization parameters.

SUMMARY OF THE INVENTION

It is an object of the present invention to substantially overcome, or at least ameliorate, one or more disadvantages of existing arrangements.

Disclosed are arrangements relating to comparing objects in images captured from a pair of cameras, based on dictionary learning using images of objects from a target domain, and images of objects from a source domain.

According to one aspect of the present disclosure, there is provided a method of comparing objects in images, the method comprising:

receiving a dictionary determined from a plurality of feature vectors formed from a test image and codes formed by applying the dictionary to the feature vectors, the dictionary being based on a difference in mean values between the codes;

determining comparison codes for the objects in the images by applying the dictionary to feature vectors of the objects in the images; and comparing the objects in the images based on the comparison codes of the objects.

According to another aspect of the present disclosure, there is provided an apparatus for comparing objects in images, the apparatus comprising:

receiving unit configure to receive a dictionary determined from a plurality of feature vectors formed from a test image and codes formed by applying the dictionary to the feature vectors, the dictionary being based on a difference in mean values between the codes;

determining unit configure to determine comparison codes for the objects in the images by applying the dictionary to feature vectors of the objects in the images; and comparing unit configure to compare the objects in the images based on the comparison codes of the objects.

According to still another aspect of the present disclosure, there is provided a non-transitory computer-readable medium storing a program for causing a computer to execute a method for comparing objects in images, the method comprising:

receiving a dictionary determined from a plurality of feature vectors formed from a test image and codes formed by applying the dictionary to the feature vectors, the dictionary being based on a difference in mean values between the codes;

determining comparison codes for the objects in the images by applying the dictionary to feature vectors of the objects in the images; and comparing the objects in the images based on the comparison codes of the objects.

According to still another aspect of the present disclosure, there is provided a system for comparing objects in images, the system comprising:

a memory for storing data and a computer program;

a processor coupled to the memory for executing the program, the program comprising instructions for:

receiving a dictionary determined from a plurality of feature vectors formed from a test image and codes formed by applying the dictionary to the feature vectors, the dictionary being based on a difference in mean values between the codes;

determining comparison codes for the objects in the images by applying the dictionary to feature vectors of the objects in the images; and comparing the objects in the images based on the comparison codes of the objects.

Other aspects of the invention are also disclosed.

BRIEF DESCRIPTION OF THE DRAWINGS

One or more example embodiments of the invention will now be described with reference to the following drawings, in which:

FIG. 1 shows a surveillance system comprising cameras connected to a computer system and a cloud service for analysing objects of interest, to which the arrangements may be applied;

DESCRIPTION OF THE EMBODIMENTS

Figure 2A:
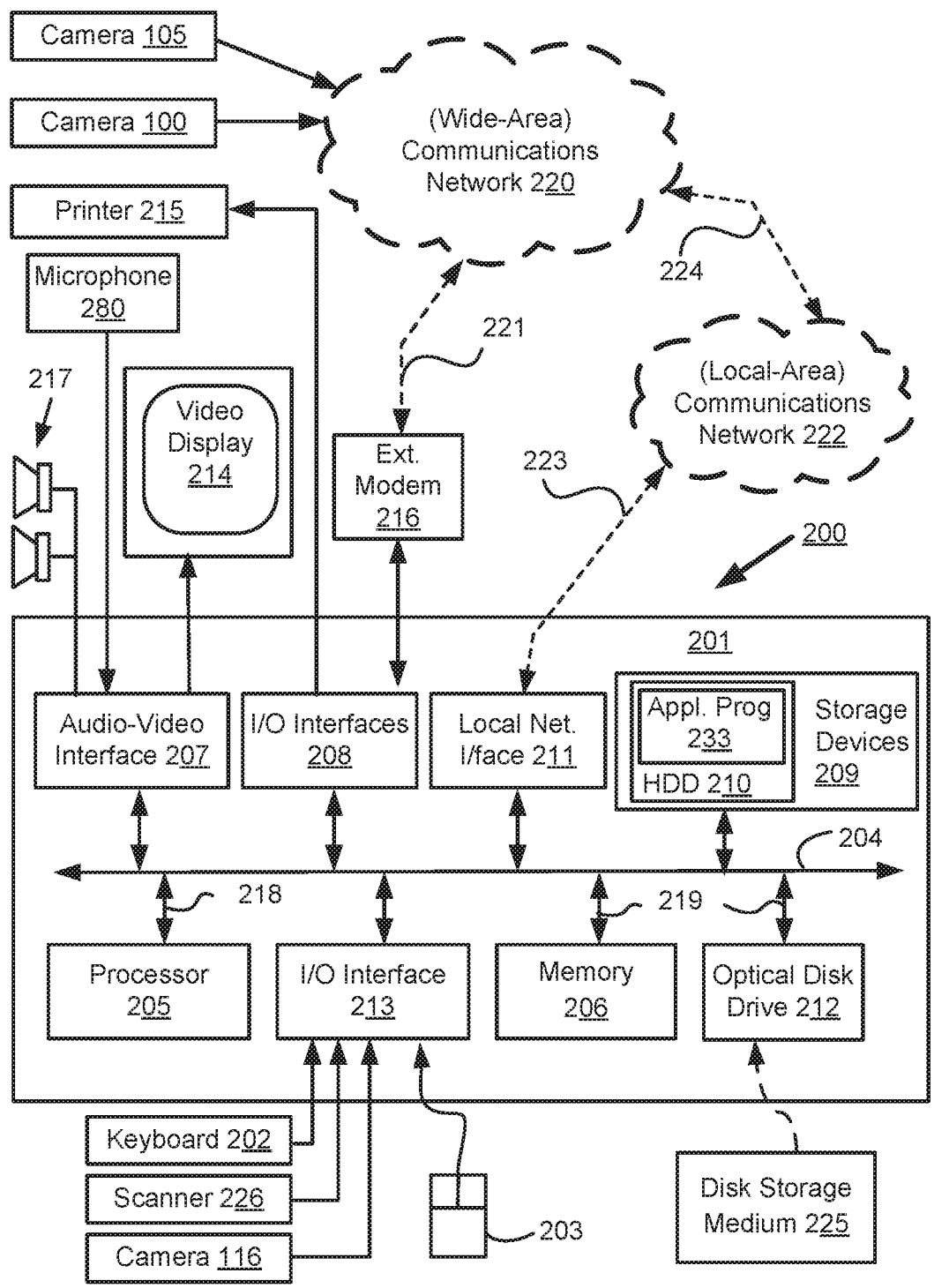
FIGS. 2A and 2B form a schematic block diagram of the computer system of FIG. 1 upon which the arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as an image 110 in FIG. 1, is made up of visual elements. The image 110 is captured using an image capture device such as a digital camera or video camera. The term "pixel", also referred to as a "pixel location" or "image location", refers in the present disclosure to one of the visual elements in a captured image. Each pixel of an image is described by one or more values characterising a property of a scene captured in the image. In one example, a single intensity value characterises a brightness of the scene at a pixel location. In another example, a triplet of values characterise a colour of the scene at the pixel location.

A "region", also referred to as an "image region", in an image refers to a collection of one or more spatially adjacent visual elements. A "bounding box" refers to a rectilinear image region enclosing an object or part of an object in an image. In one example, the bounding box 131 in FIG. 1 encloses a person 130. A "feature", also referred to as an "appearance descriptor" or "descriptor", represents a derived value or set of derived values determined from the pixel values in an image region. One example is a histogram of colour values in an image region. Another example is a histogram of quantized image gradient responses in a region.

The phrase "foreground mask" refers to a binary image with non-zero values at pixel locations corresponding to an object of interest. In one example, the terms "candidate object" and "object of interest" may refer to a person in a crowd that has been identified as being of particular interest. A non-zero pixel location in a foreground mask is known as a "foreground pixel". In one arrangement, a foreground mask is determined using a statistical background pixel modeling method such as Mixture of Gaussian (MoG), wherein the background model is maintained over multiple frames with a static camera. In another arrangement, foreground detection is performed on Discrete Cosine Transform blocks. In yet another arrangement, a foreground mask is determined using unsupervised segmentation, for example using superpixels. Any suitable method for determining a foreground mask may equally be practised.

The present description provides a method and system for comparing objects in images captured from a first pair of cameras, based on dictionary learning using images of objects from a target domain, and images of objects from a source domain. FIG. 1 shows an example surveillance system 100 to which disclosed arrangements may be applied. In one example, the described method may be used to determine whether an object observed in an image 120 of a first scene captured by a first digital camera 125 has the same identity as a second object detected in an image 110 of a second scene captured by a second digital camera 115. In the arrangements described, the terms "object", "person" and "target" relate to "an object of interest" within at least partial view of one of the cameras 125 and 115. Disclosed arrangements may equally be applied when the images are captured with different environmental factors. For example, the images may be captured by different cameras simultaneously or at different times, or captured by the same camera at different times, including images that represent the same scene or different scenes.

Figure 2B:
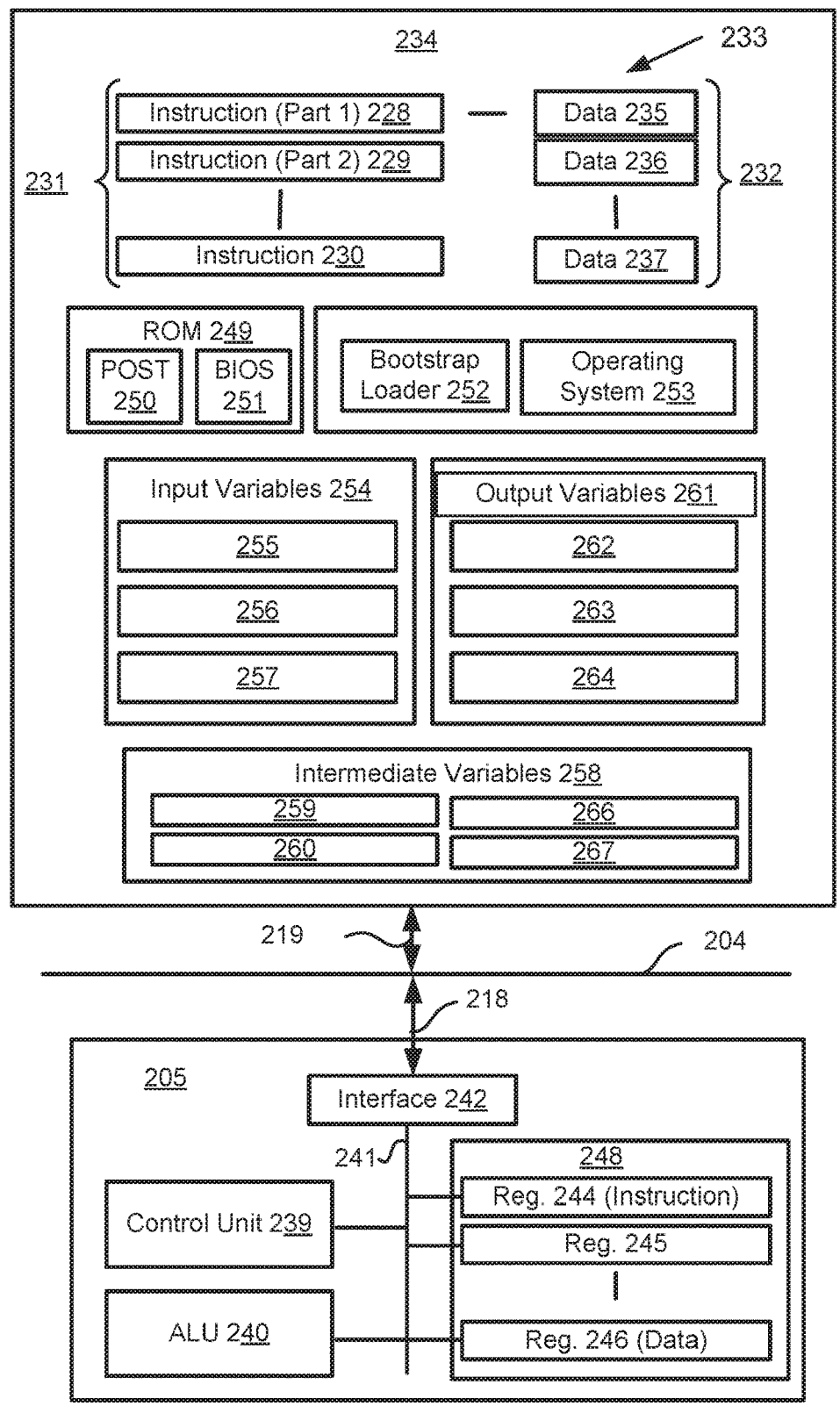

The cameras 115 and 125 may be any type of image capture device suitable for capturing an image of a scene using a sensor such as an optical sensor, an infrared sensor, a radar sensor, and the like or be multi-sensor devices. The images used for matching objects are captured by the same type of sensor. The cameras 115 and 125 may be a digital camera, for example. The cameras 115 and 125 are connected to a computer system 200 as seen in FIGS. 2A and 2B. The computer system 200 is connected to a cloud server 160, via a communications network 220, to which arrangements described may be applied. The cameras 115 and 125 may be in wired or wireless communication with the computer system 200, and the computer system 200 may be in wired or wireless communication with the cloud server 160.

The terms "re-identification", "hand-off" and "matching" relate to the task of relating an object of interest within at least partial view of a video camera (e.g., the camera 115) to another object within at least partial view of the same or another video camera (e.g., the camera 125).

For the example in FIG. 1, a first object is known as a "query" object, and a second object is known as a "gallery" object. A query object may be a person who has been identified as being suspicious at an airport, and a gallery object is a person in a crowded airport, the person being merely a member of the crowd. The gallery object may also be referred to as a "candidate object". In one example, a person 132 in an image 120 is a query object, and three people 130, 134 and 136 in an image 110 are gallery objects. The arrangements described are applied to determine which of the three gallery objects 130, 134 and 136 is a best match for the query object 132.

The example of FIG. 1 may be applied to a range of applications. In one example, the computer system 150 allows a security guard to select a query object through an interactive user interface, and returns images of one or more gallery objects determined to match the query object. In another example, the computer system 200 automatically selects a query object and matches the object across multiple distributed cameras in order to analyse the long-term behaviour of the object. In other arrangements, the computer system 200 is integral to one of the cameras 115 and 125.

While the examples in this disclosure generally relate to surveillance tasks of monitoring persons, the described methods may equally be practised on other types of objects. For example, the described methods may be applied to track a suspicious vehicle. The described methods may also be implemented using different types of sensors including near IR cameras, radar sensors, and laser scanners.

For the example in FIG. 1, the query and gallery objects may be matched by extracting an appearance descriptor for the query object from a bounding box 133, and appearance descriptors for the gallery objects 130, 134 and 136 from the bounding boxes 131, 135 and 137 respectively. A similarity score is determined between the query object and each gallery object based on the appearance descriptors. The gallery object with the greatest similarity to the query object is determined to have the same identity as the query object.

The similarity score is in part based on a learned representation of object appearance determined using dictionary learning. The learned representation, represented by atoms in the dictionary, is derived from a set of training images of objects of the same type as the query and gallery object. Typically, the training images originate from an existing dataset, known as the source domain training data, collected from cameras other than the query and gallery cameras. For the example shown in FIG. 1, the source domain training data 180 pre-exists on the cloud server 160.

Typically, a dictionary learned from only source domain data 180 may perform very poorly if the camera viewing angle, lighting conditions, person orientation and clothing that characterize the images captured by cameras 115 and 125 differ significantly from the source domain data. The present description provides a method to improve the learned representation by additionally using target domain training data to train the dictionary without the knowledge of the identities of objects. For the example in FIG. 1, the target domain training data 170 is collected from cameras 115 and 125 during a training phase of operation, and communicated from the computer system 200 to the cloud service 160. A dictionary is learned on the cloud server 160 based on the target domain training data 170 and pre-exiting source domain training data 180, and transmitted back to the computer system 200.

FIGS. 2A and 2B depict the computer system 200, upon which the arrangements described can be practiced.

As seen in FIG. 2A, the computer system 200 includes: a computer module 201; input devices such as a keyboard 202, a mouse pointer device 203, a scanner 226, one or more cameras such as a cameras 116, and a microphone 280; and output devices including a printer 215, a display device 214 and loudspeakers 217. An external Modulator-Demodulator (Modem) transceiver device 216 may be used by the computer module 201 for communicating to and from remote cameras such as the cameras 100 and 105 over the communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The remote cameras 100 and 105 form part of the camera network 101. In the arrangements described, the cameras 100 and 105 relate to video cameras. The camera network 101 can comprise any type of image capture devices capable of capturing image and/or video data from which vanishing points can be determined. The camera network 101 comprises a plurality of a single type of image capture device. In other arrangements, image capture devices integral or proximate to the computer module 201, such as the camera 116, can form part of the camera network 101.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 116 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The methods described may be implemented using the computer system 200 wherein the processes of FIGS. 3, 4, 5 and 6, and 9, to be described, may be implemented as one or more software application programs 233 executable within the computer system 200. In particular, the steps of the methods described are effected by instructions 231 (in FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the methods described and a second part and the corresponding code modules manage a user interface between the first part and the user.

The software 233 may be stored in a computer readable medium, including the storage devices described below, for example. The software 233 is typically stored in the HDD 210 or the memory 206. The software is loaded into the computer system 200 from the computer readable medium, and then executed by the computer system 200. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 200 preferably effects an advantageous apparatus for implementing the methods described.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfill various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using the connection 218. The memory 234 is coupled to the bus 204 using the connection 219.

The application program 233 includes the sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The arrangements described use input variables 254, which are stored in the memory 234 in corresponding memory locations 255, 256, 257. The arrangements described produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 6 and 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The methods described may alternatively be implemented in dedicated hardware such as one or more integrated circuits performing the functions or sub functions. Such dedicated hardware may include graphic processors, digital signal processors, or one or more microprocessors and associated memories, and may reside on platforms such as video cameras.

Figure 3:
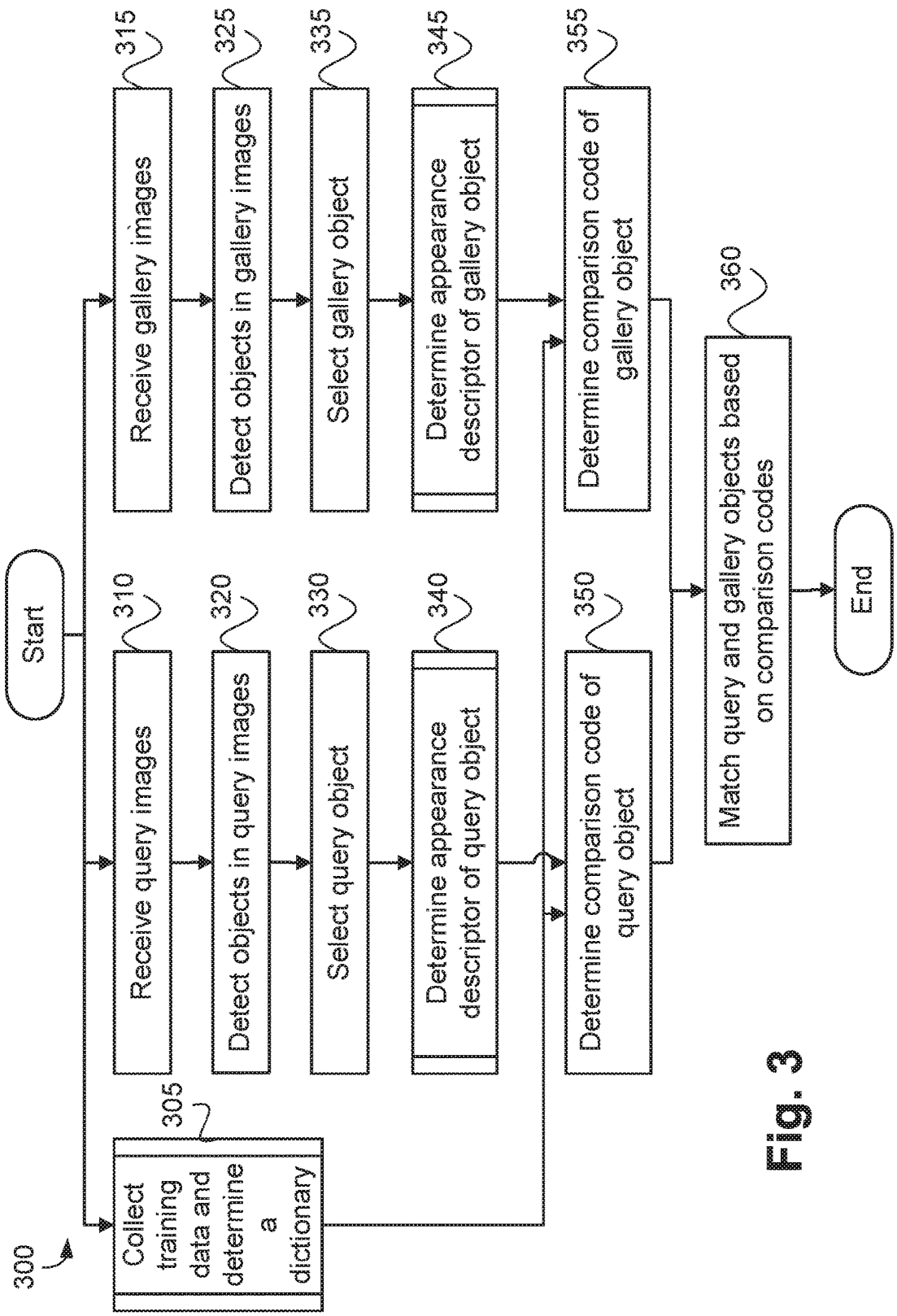
FIG. 3 is a schematic flow diagram showing a method of matching objects between a query image and a gallery image using a learned dictionary.

FIG. 3 shows a method 300 of matching objects between images by comparing comparison codes determined using dictionary learning.

In one example, the matching method 300 is used to determine a gallery object in an image matched to the query object. The method 300 is typically implemented by one or more software code modules of the application 233, stored in the hard disk drive 210 and controlled under execution of the processor 205. In some arrangements, portions of the method 300 are executed on a processor of a cloud server computer, such as the cloud server 160.

The method 300 is described by way of example with reference to the query image 120 containing the object of interest 132 detected at the bounding box 133, and the gallery image 110 containing candidate objects 130, 134 and 136, detected at the bounding boxes 131, 135 and 137. In the example described, the method 300 is used to determine which of the detections 131, 135 and 137 is the object of interest 132 detected at 133. The following description provides details, examples and alternative implementations for the main steps of the method 300. Further details, examples and alternative implementations of step 305, 340 and 345 are described hereafter.

The method 300 starts at a determining step 305. At step 305, a dictionary is determined (or "learned") based on a training dataset from target domain images collected from the query and gallery cameras, and additional source domain training data. In some arrangements, the target domain images are processed on the computer system 200 to extract appearance descriptors, which are then transmitted to a cloud server 160 to learn a dictionary. In other arrangements, the target domain images are transmitted to the cloud server 160 for processing. In yet other arrangements, image processing and dictionary learning are processed locally on the computer system 200. A method 400 of collecting training data and determining (or "learning") a dictionary, as executed at step 305 of method 300, are described hereafter with reference to FIG. 4. The output of step 305 is a dictionary for determining comparison codes. The dictionary may be stored in the memory 206.

The method 300 also starts at a receiving step 310. At execution of the step 310, at least one image containing a query object is received as input. For example, the image 120 is a query image received from a query camera 125 containing a query object 132. The image 120 may be stored in the memory 206. The method 300 progresses under execution of the processor 205 from the receiving step 310 to a detecting step 320. The detecting step 320 executes to detect a query object from the received query images. One example of detecting the query object uses a pedestrian detection method to detect all persons in the query images. A commonly-used pedestrian detection method learns a detector to search for persons within an image by scanning pixel locations. The detector produces a high score if the local image features inside the local search window meet certain criteria. The local image feature may be the histogram of oriented gradients or local binary pattern. Other pedestrian detection methods include a part-based detection method and a background subtraction method. The output of the pedestrian detection method is a set of bounding boxes. The image region defined by each bounding box contains a person.

The method 300 progresses under execution of the processor 205 from the detecting step 320 to a selecting step 330. In one arrangement, a user such as a security guard manually selects an automatically detected bounding box, such as the bounding box 133, as the query object via a graphical user interface executing on the module 201. In another arrangement, the user manually draws a bounding box containing an object to define the query object via a graphical user interface executing on the module 201. In yet another arrangement, an algorithm executing on the module 201 automatically selects an automatically detected bounding box, such as the bounding box 133, as the query object based on pre-defined rules. The output of step 330 is an image region within a bounding box for the query object.

The method 300 progresses under execution of the processor 205 from the step 330 to a determining step 340. An appearance descriptor for the query object is determined at step 340 based on pixels in the image region determined at step 330. A method 500 of determining an appearance descriptor of an object, as executed at step 340, will be described hereafter with reference to FIG. 5. The output of step 340 is an appearance descriptor characterizing the query object.

The method 300 progresses under execution of the processor 205 from step 340 to a determining step 350, where a comparison code for the query object is determined based on the learned dictionary determined at step 305. In one arrangement, the comparison code a' for an appearance descriptor x determined at step 340 is be determined by solving the Lasso problem shown in Equation (1) using a sparse coding algorithm, e.g., least angle regression algorithm $$a'=\mathrm{argmin}_a \|x-Da\|_2^2+\lambda\|a\|_1 \qquad (1)$$

where $\|\cdot\|_2$ denotes 2-norm of a vector, $\|\cdot\|_1$ denotes 1-norm of a vector, D represents the learned dictionary, x represents the appearance descriptor, a represents the comparison code, and λ represents a regularisation factor. The regularisation factor may be pre-defined, e.g., λ=0.01, or may be determined during the "training" phase using known methods such as cross-validation. In another arrangement, the comparison code a' for an appearance descriptor x may be determined by solving a regularised least squares problem to obtain the closed-form solution of Equation (2), as follows:

$$a'=(D^T D+\rho I)^{-1} D^T x \qquad (2)$$

where ρ is a regularisation factor that may be predefined, e.g., ρ=0.5, or may be determined during the "training" phase using any suitable method such as cross-validation. The output of step 350 is a comparison code corresponding to the query object selected at step 330. The comparison code may be stored in the memory 206.

As seen in FIG. 3, the method 300 also starts at a receiving step 315. In one arrangement, steps 305, 310 and 315 start concurrently. In another arrangement, steps 305, 310 and 315 are executed at different times. In all arrangements, step 305 is executed before steps 350 and 355. In some arrangements, step 305 is executed during an initial installation or "training" phase, while the remaining steps in method 300 are executed during routine operation after the "training" phase has finished. Furthermore, steps 350 and 355 are executed before step 360 in all arrangements.

At execution of step 315, at least one image containing gallery objects is received as input. For example, the image 110 is a gallery image received from a gallery camera 115 containing gallery objects 132, 134 and 136. The method 300 progresses under execution of the processor 205 from step 315 to a detecting step 325. At step 325, a set of gallery objects is detected in the received gallery images. In one arrangement, step 325 is implemented for gallery objects in a similar manner to step 320 for query objects. The output of step 325 is a set of bounding boxes, such as the bounding boxes 131, 135 and 137 corresponding to the gallery objects 130, 134 and 136.

The method 300 progresses under execution of the processor 205 from step 325 to a selecting step 335. At the selecting step 335, a gallery object is selected for comparing with the query object determined at step 330. In one arrangement, the gallery objects determined at detecting step 325 are stored in a list, for example in the memory 206, and a gallery object is selected by enumerating the objects in the list. In other arrangements, step 335 is implemented for gallery objects in a similar manner to step 330 for query objects. The output of the selecting step 335 is an image region within a bounding box for the gallery object. The image region output at step 335 may be stored in the memory 206.

The method 300 progresses under execution of the processor 205 from the step 335 to a determining step 345. An appearance descriptor for the gallery object is determined at step 345 based on pixels in the image region determined at step 335. Further details, examples and alternative implementations of the step 345 are described hereafter with reference to FIG. 5. The output of step 345 is an appearance descriptor characterizing the gallery object. Again, the appearance descriptor output at step 345 may be stored in the memory 206.

The method 300 progresses under execution of the processor 205 from step 345 to a determining step 355, where a comparison code for the gallery object is determined. In one arrangement, step 355 is implemented for the gallery object in a similar manner to step 350 for the query object. The output of step 355 is a comparison code corresponding to the gallery object selected at step 335. The comparison code output at step 355 may be stored in the memory 206.

After execution of steps 350 and 355, the method 300 progresses under execution of the processor 205 to a matching step 360. At the matching step 360, the comparison code of the selected query object determined at step 350 and the comparison code of the selected gallery object determined at step 355 are compared to determine whether the objects have the same identity. In one arrangement, a comparison is performed at step 360 by determining a similarity or dissimilarity score between the comparison codes. One example of a dissimilarity score is a Euclidean distance between the comparison codes. One example of a similarity score is a Cosine distance between the comparison codes. Any other suitable similarity or dissimilarity scores may be determined to compare two comparison codes.

One example of determining whether the two objects match (i.e., have the same identity) is to compare a similarity score to a fixed threshold. If a similarity score exceeds the threshold, the query and gallery object are determined to have the same identity.

Another example of determining whether the query object has the same identity as the gallery object is to compare the similarity score to the similarity score between the query object and all other objects in the video stream. If the similarity score for the gallery object is less than all other objects, the query and gallery object are determined to have the same identity.

The computer system 200 generates a response if the two objects are determined to have the same identity. In one example, the match is communicated to a user through a graphical user interface. In another example, the response is to tag the gallery object for further automatic analysis, such as tracking the gallery object through the field of view of the gallery camera.

The method 300 concludes after completing the matching step 360.

The method 400 of collecting training data and determining a dictionary, as executed at step 305 of method 300, is now described with reference to FIG. 4. The method 400 is typically implemented at least in part as one or more software code modules of the software application program 233 resident in the hard disk drive 210 and being controlled in execution by the processor 205. The method 400 may in some arrangements be executed at least in part on a processor of the cloud server 160.

The method 400 starts at a collecting step 410. In execution of the step 410, images containing a plurality of objects are collected from the target domain. One example of a target domain is a set of cameras installed at a customer site. For the example application in FIG. 1, cameras 115 and 125 are examples of cameras installed at a customer site, and images 110 and 120 are examples of target domain images containing a plurality of objects. The images collected at step 410 may be stored within the memory 206.

The method 400 passes under execution of the processor 205 from step 410 to a detecting step 420. At step 420, a set of objects is detected in the target domain images collected at step 410. In one arrangement, at step 420, objects in the target domain images are detected in a similar manner to step 320 for query objects. The output of step 420 is a set of bounding boxes, such as the bounding boxes 131, 133, 135 and 137 corresponding to the objects 130, 132, 134 and 136 in the target domain images 110 and 120. The determined bounding boxes 131, 133, 135 and 137 may be stored in the memory 206.

The method 400 progresses under execution of the processor 205 from the step 420 to a determining step 430. An appearance descriptor for each detected object in the target domain is determined at step 430 based on pixels in the bounding boxes determined at step 420. The appearance descriptor is determined in accordance with the method 500 which will be described hereafter with reference to FIG. 5. The output of step 430 is a set of appearance descriptors describing the detected objects in the target domain images. The set of appearance descriptors determined at step 430 is also known as the "target domain training data".

Figure 4:
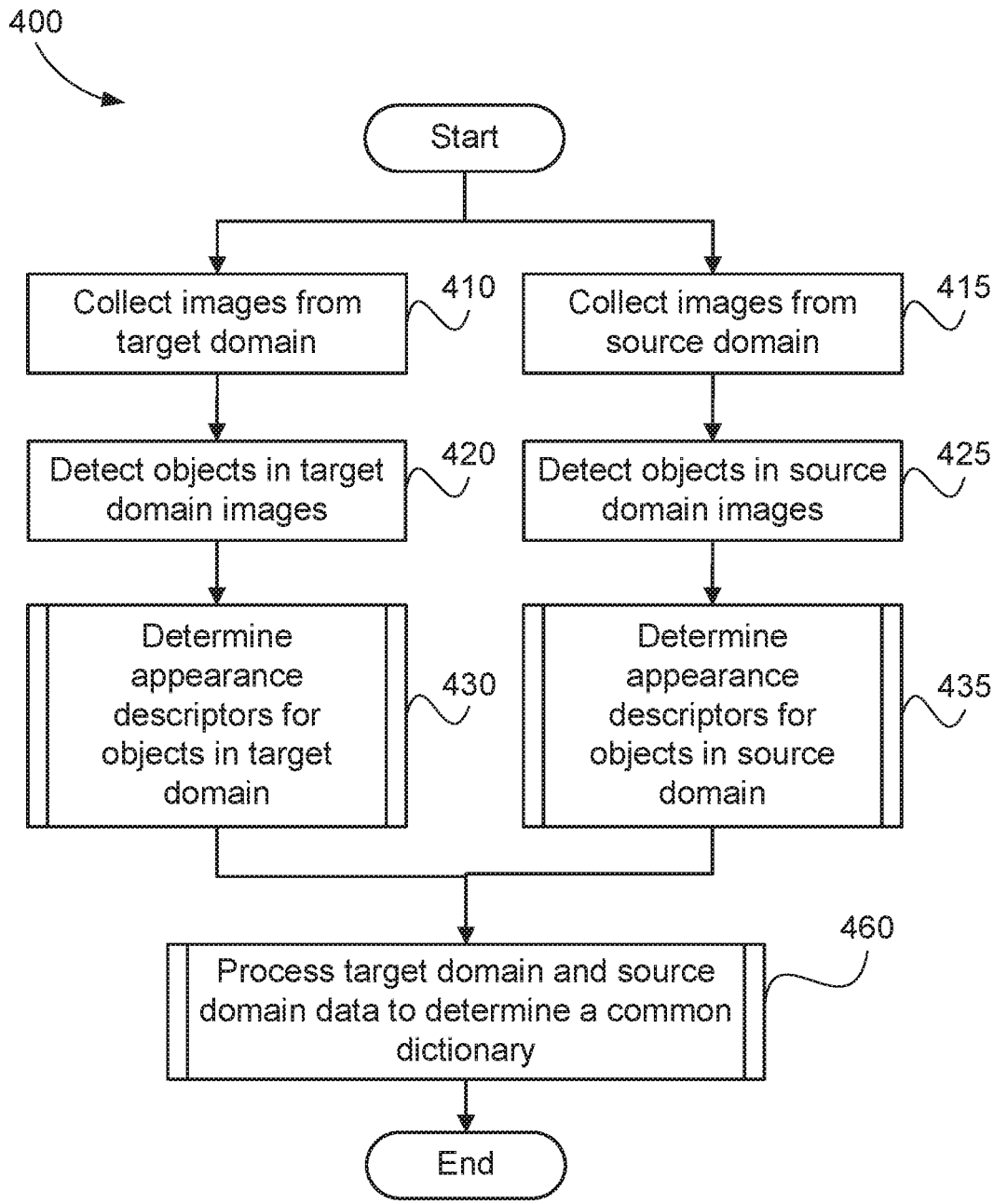
FIG. 4 is a schematic flow diagram of a method of collecting a training dataset and determining (or "learning") a dictionary based on the collected training dataset as used in the method of FIG. 3.

As seen in FIG. 4, the method 400 also starts at a collecting step 415. In one arrangement, steps 410 and 415 are executed concurrently. In another arrangement, steps 410 and 415 are executed at different times. In one arrangement, steps 415, 425 and 435 are executed in the factory before the system 100 is installed at a customer site, and steps 410, 420 and 430 are executed after installing the system 100 but before regular operation, during an initial "training" phase. Steps 430 and 435 are executed before step 460 in all arrangements.

In execution of step 415, images containing a plurality of objects are collected from the source domain. In one arrangement, source domain images are collected from publicly available datasets, such as the VIPeR dataset. In another arrangement, source domain images are collected from one or more cameras other than the cameras in the target domain. In one example, source domain images are collected from cameras owned by the camera manufacturer.

The method 400 passes under execution of the processor 205 from step 415 to a detecting step 425. At step 425, a set of objects is detected in the source domain images collected at step 415. In one arrangement, at step 425, detects objects in the source domain images are detected in a similar manner to step 420 for target domain images. The output of step 425 is a set of bounding boxes which may be stored in the memory 206.

The method 400 progresses under execution of the processor 205 from the step 425 to a determining step 435. An appearance descriptor for each detected object in the source domain is determined at step 435 based on pixels in the bounding boxes determined at step 425. The appearance descriptor is determined at step 435 using the method 500 which is described hereafter with reference to FIG. 5. The output of step 435 is a set of appearance descriptors describing the detected objects in the source domain images. The set of appearance descriptors determined at step 435 is also known as the "source domain training data" which may be stored in the memory 206.

After execution of steps 430 and 435, the method 400 progresses under execution of the processor 205 to a determining step 460. At step 460, the target domain training data and source domain training data are used to determine (or learn) a common dictionary. A method 600 of determining a dictionary using source and target domain training data, as executed at step 460, will be described hereafter with reference to FIG. 6.

The dictionary may be learned on a customer server such as the computer system 200 in FIG. 1 or, in some arrangements, at a cloud server such as the cloud server 160. Furthermore, steps 415, 425 and 435 for determining the source domain training data may also be executed on a cloud server. If the dictionary is learned on a cloud server, the target domain dataset determined at step 430 is transmitted via the network 220 from the customer server to the cloud server prior to the execution of step 460. After execution of step 460, the learned dictionary is transmitted via the internet from the cloud server back to the customer server.

Figure 5:
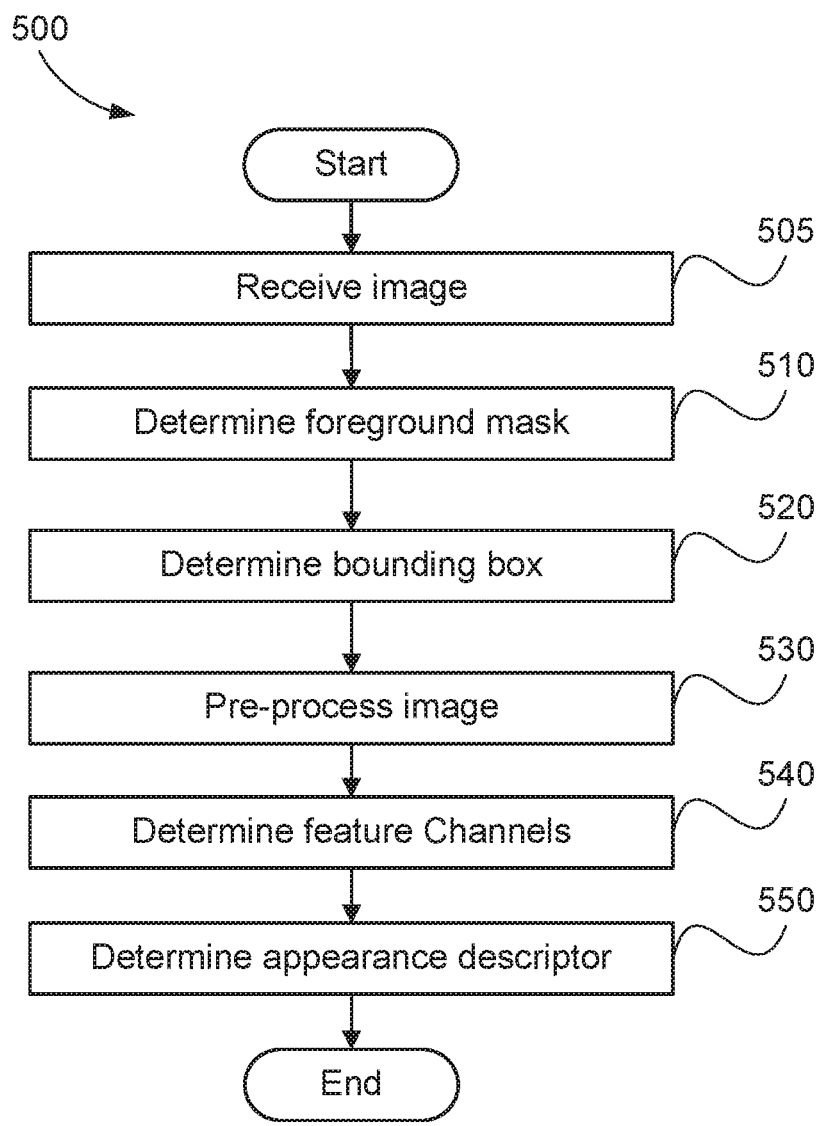
FIG. 5 is a schematic flow diagram of a method of determining an appearance descriptor of an object as used in the method of FIG. 3 and the method of FIG. 4.

The method 500 of determining an appearance descriptor of an object, as executed at the steps 340 and 345 of the method 300 and steps 430 and 435 of the method 400, is now described with reference to FIG. 5. The method 500 may be implemented within the module 201 as one or more software code modules of the software application program 233 resident in the hard disk drive 210 and being controlled by execution of the processor 205.

The method 500 starts at a receiving step 505, in which an image or image sequence containing an object and a corresponding bounding box, such as the bounding box selected at step 330 or 335, are received as input. The image or image sequence may be stored in the memory 206. In one arrangement, the bounding box contains the whole body of a person. In one example, when the method 500 is applied to the query object 132 shown in FIG. 1, step 505 receives the image 120 and the bounding box 133 as input. In another example, the bounding boxes containing head regions of persons are received.

The method 500 passes under execution of the processor 205 from the step 505 to a determining step 510. At step 510, a foreground confidence mask is determined under execution of the processor 205 and may be stored in the memory 206. The foreground confidence mask assigns to each pixel in the bounding box received at step 505 a value indicating a confidence that the pixel belongs to an object. In one arrangement, a foreground confidence mask is determined at step 505 by performing foreground separation using a statistical background pixel modeling method such as Mixture of Gaussian (MoG), wherein the background model is maintained over multiple frames with a static camera.

The method 500 passes under execution of the processor 205 from step 510 to a refining step 520. At step 520, the bounding box received at step 505 is refined to tightly bound the body of the person, based on the foreground confidence mask determined at step 510. In one arrangement, the bounding box for the head region received at step 505 is converted to a full body bounding box by only including the pixels with a foreground confidence value determined at step 510 higher than a per-defined threshold and within a reasonable distance from the head region. In another arrangement, the bounding box for the whole body received at step 505 is refined (by shrinking or extending) to include the pixels with a foreground confidence value determined at the step 510 higher than a per-defined threshold and within a reasonable distance from the body region.

The method 500 passes under execution of the processor 205 from step 520 to a pre-processing step 530. In execution of the pre-processing step 530, the image region inside the bounding box determined at step 520 is pre-processed for feature determination. In one arrangement, a weighting scheme is used to weight every pixel of the image region inside the bounding box determined at step 520. One example of the weighting scheme uses a 2-D Gaussian function to weight the pixels based on the spatial locations. The pixels located close to the centre of the bounding box is assigned by higher weight than the pixels located further from the centre of the bounding box. Another example of the weighting scheme uses the foreground confidence mask determining step 510 to weight the pixels based on the distances from the pixel locations to the geometric mean of the foreground confidence mask. In another arrangement, the observed object in the bounding box determined at step 520 is rectified to a vertical orientation, which reduces a variation in the visual appearance of an object due to the viewpoint of the camera. In yet another arrangement, colour normalization is applied to the image inside the bounding box determined at step 520 to compensate lighting changes across cameras.

The method 500 passes under execution of the processor 205 from step 530 to a determining step 540. At step 500, feature channels for the pre-processed image generated in the step 530 are determined under execution of the processor 205. At each feature channel, each pixel in the image is assigned a feature value. In one arrangement, a feature channel is the red channel of the image. In another arrangement, a feature channel is the green channel of the image. In yet another arrangement, a feature channel is the blue channel of the image. In still another arrangement, a feature channel is local binary patterns (LBP) of the image. In yet another arrangement, a feature channel is the image gradient of the image.

The method 500 passes under execution of the processor 205 from step 540 to a determining step 550. At step 550, the appearance descriptor is determined from the feature channels determined at the step 540. The appearance descriptor, also referred to as a feature vector, is determined based on pixel properties of pixels in a region of an image. The determined appearance descriptor may be stored in the memory 206 under execution of the processor 205.

In one arrangement, the appearance descriptor is determined at step 540 by concatenating pixel properties such as colour, texture and shape feature components, encoding a spatial distribution of colour and texture by dividing an image into regions. The colour feature component consists of colour histograms determined independently over numerous horizontal stripes (e.g., 15), from the colour feature channels determined at step 540. Histograms are normalized to a sum of unity for each stripe. The shape feature component is a histogram of oriented gradients (HOG) descriptor calculated based on the image gradient feature channel determined at step 540. The texture feature component consists of LBP histograms determined independently for cells with pre-defined size, based on the LBP feature channel determined at step 540. The appearance descriptor is formed by concatenating the square root of the above components to form a single vector. In another arrangement, the appearance descriptor is determined at step 540 by encoding appearance as the difference between histograms across pairs of local regions.

In one arrangement, at step 550, the appearance descriptor is transformed by a subspace projection, in which the appearance descriptor is projected to a low-dimensional subspace. One example of a subspace projection is a Principal Component Analysis (PCA) projection. Another example of a subspace projection is a Locally-Linear Embedding (LLE).

The method 500 concludes after completing the determining step 550. An appearance descriptor is typically in the form of a vector and may also be referred to a plurality of feature vectors. The steps 510 to 550 effectively operate to determine feature vectors based on pixel properties of pixels in the received image or sequence of images.

Figure 6:
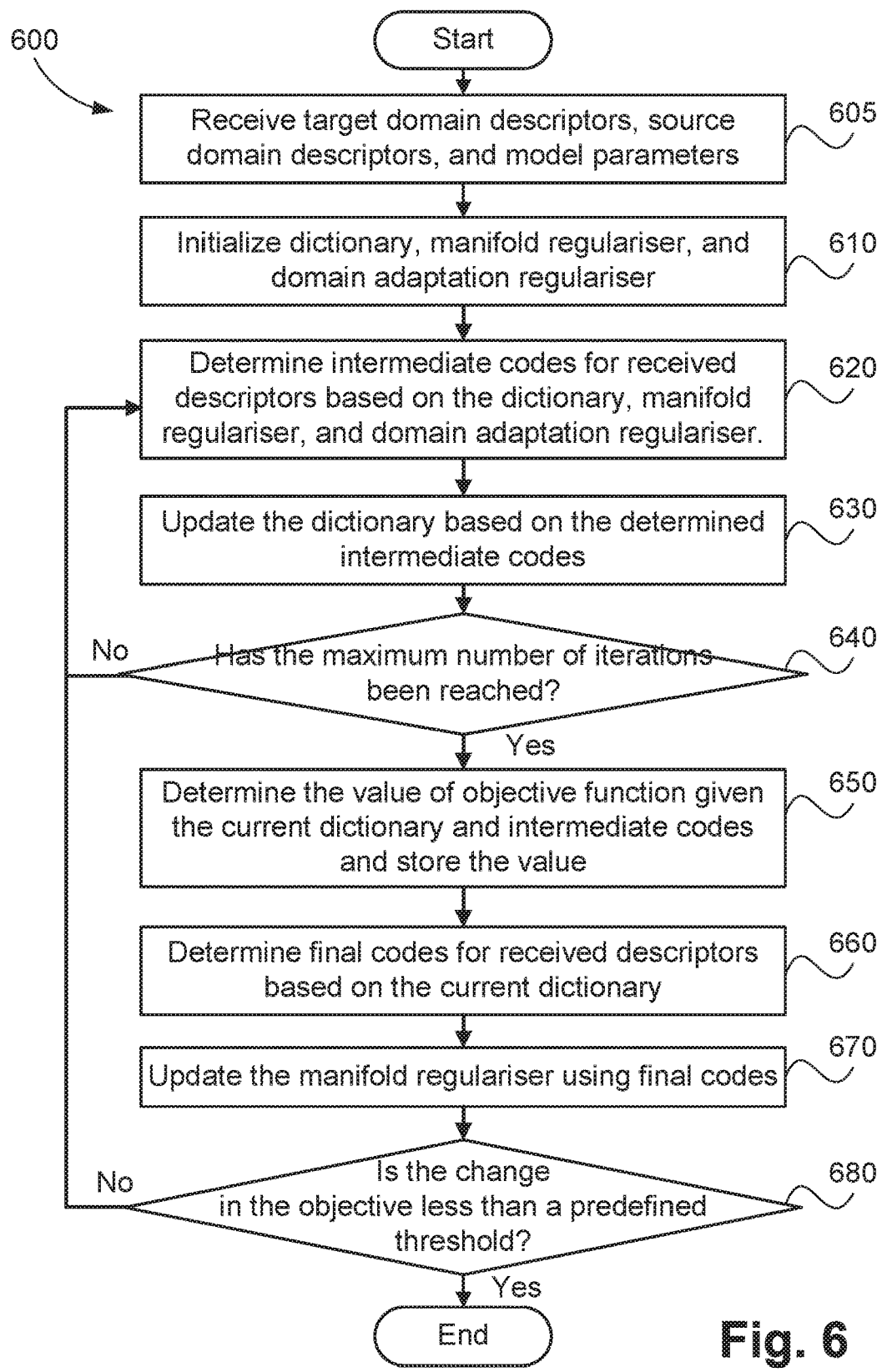
FIG. 6 is a schematic flow diagram of a method of determining a dictionary using source and target domain training data as used in the method of FIG. 4.

The method 600 of determining a dictionary, as executed at step 460 of the method 400, will now be described with reference to FIG. 6. The method 600 learns a common dictionary for source and target domain by minimising an objective function comprised of a reconstruction error with sparsity, manifold, and domain adaptation regularisers. Denote $x_S(i)$ and $x_T(j)$ as appearance descriptors extracted from the i-th source and the j-th target training image using the method 500, respectively. The objective function is described in accordance with Equation (3), as follows:

$$\min_{D,A} \|X-DA\|_F^2 + \lambda R_S(A) + \beta R_M(A) + \gamma R_D(A) \qquad (3)$$

where $\|\cdot\|_F$ denotes the Frobenius norm of a matrix, D represents the common dictionary, $X=[x_S(1), \ldots, x_S(N_S), x_T(1), \ldots, x_T(N_T)]$ represents input data comprised of $(N_S+N_T)$ appearance descriptors extracted from source and target domain training images, $A=[a_S(1), \ldots, a_S(N_S), a_T(1), \ldots, a_T(N_T)]$ represents $(N_S+N_T)$ comparison codes for corresponding appearance descriptors based on the common dictionary D, and $R_S(A)$, $R_M(A)$, and $R_D(A)$ represent the sparsity, manifold, and domain adaptation regularisation, respectively. The regularisation factors $\lambda$, $\beta$, and $\gamma$ control the balance between the reconstruction error and the regularisers. In one arrangement, the sparsity regulariser $R_S(A)=\sum_{i=1}^{N_s+N_T}\|a_i\|_1$ measures the sparsity of a comparison code $a_i$ using $l_1$-norm. If the trace of a matrix B is defined as trace(B), the manifold regulariser $R_M(A)$ in one arrangement is $R_M(A)=\text{trace}(ALA^T)$, which makes the atoms of the dictionary respect the neighbouring relationship underlying the input data using the graph Laplacian matrix L. If two appearance descriptors $x_i$ and $x_j$ are close to each other, then the corresponding comparison codes $a_i$ and $a_j$ are also close to each other. The domain adaptation regulariser $R_D(A)=\text{trace}(AMA^T)$ in one arrangement measures the distance from the mean value of comparison codes for source domain data and the mean value of comparison codes for target domain data. The element of the matrix M in the domain adaptation regulariser $R_D(A)$, i.e., $M_{ij}$, is equal to $1/N_S^2$ if the comparison codes $a_i$ and $a_j$ are obtained for appearance descriptors extracted from source domain training images. If the comparison codes $a_i$ and $a_j$ are obtained for appearance descriptors extracted from target domain training images, the element $M_{ij}$ is equal to $1/N_T^2$. If the comparison codes $a_i$ and $a_j$ are obtained for appearance descriptors extracted from source and target domain training image respectively, the element $M_{ij}$ is equal to $-1/N_S N_T$.

The method 600 starts at a receiving step 605, wherein target domain appearance descriptors, source domain appearance descriptors, and model parameters $\lambda$, $\beta$, and $\gamma$ are received as input under execution of the processor 205. The initial values of model parameters $\lambda$, $\beta$, and $\gamma$ may be pre-selected, e.g., $\lambda=0.01$, $\beta=1.0$, and $\gamma=1.0$, or may be obtained by using cross-validation technique. The dictionary, the manifold regulariser, and domain adaptation regulariser are initialised at initialising step 610. Because the dictionary has not been determined (or learned), the graph Laplacian matrix L of the manifold regulariser $R_M(A)$ is initialised using the received appearance descriptors. In one arrangement, the graph Laplacian matrix L is constructed based on the k nearest neighbours of each appearance descriptor that are determined by calculating distances between appearance descriptors. The number of nearest neighbours k is predefined, e.g., k=3. The distance between appearance descriptors may be Euclidean distance or cosine distance. The matrix M of the domain adaptation regulariser $R_D(A)$ is initialised by the number of source domain and target domain appearance descriptors. In one arrangement, the dictionary is initialised by a random matrix where each element is a random number generated from a Gaussian distribution or may also be initialised by using a K-SVD algorithm.

Control then passes from the initialisation step 610 to an intermediate code determination step 620, where intermediate codes for the received appearance descriptors are determined by applying the current dictionary to the received appearance descriptors. The intermediate codes for the received appearance descriptors are determined based on the current dictionary, manifold regulariser, and domain adaptation regulariser. In one arrangement, the intermediate code for each appearance descriptor is determined by using a sparse coding algorithm, (e.g., feature-sign search algorithm). Next, the dictionary is updated at step 630 by fixing the intermediate codes determined at step 620.

Control then passes from the updating step 630 to a decision step 640, where if the maximum number of iterations has been reached, No, then the method 600 returns from the decision step 640 to the determination step 620. If the maximum number of iterations has been reached, Yes, then the method 600 proceeds from the decision step 640 to a determination step 650. At step 650, the value of the objective function is determined based on the learned dictionary and intermediate codes. The objective function value may be stored in the memory 206.

Next, the final codes for the received appearance descriptors are determined based on the current dictionary at step 660. In one example, the final code for a received descriptor is determined by using a sparse coding algorithm, e.g., least angle regression algorithm. In another example, the final code for a received descriptor is determined by solving a regularised least squares problem.

Control then passes from the determination step 660 to an updating step 670, wherein the graph Laplacian matrix L of the manifold regulariser $R_M(A)$ is constructed using the final codes determined at step 660. In one arrangement, the k nearest neighbours of each final code are determined by determining distances between final codes used to construct the graph Laplacian matrix L. One example of a distance between final codes is a Euclidean distance. Another example of a distance between final codes is a cosine distance.

Control then passes from the updating step 670 to a decision step 680, where if the change in the objective function is less than a predefined threshold (for example, 0.0001), No, then the method 600 returns from decision step 680 to the determination step 620. The change in the objective function is the absolute difference in the values of objective function determined at the current iteration and previous iteration. If the change in the objective function is smaller than the pre-defined threshold, then the method 600 concludes after completing the decision step 680.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method to compare objects in images from a target domain, the method comprising:
receiving a dictionary determined from a plurality of feature vectors and codes, wherein the plurality of feature vectors was formed from a test image in the target domain, the codes were formed by applying the dictionary to the plurality of feature vectors of the target domain, and the dictionary is based on source domain training data and on a difference in mean values between the formed codes;
determining comparison codes for the objects in the images by applying the dictionary to feature vectors of the objects in the images; and
comparing the objects in the images based on the comparison codes of the objects.

2. The method according to claim 1, wherein the comparison codes compensate for different environmental factors in the test images.

3. The method according to claim 1, further comprising:
determining an initial dictionary using the test feature vectors to determine a manifold and a difference in mean values; and
updating the determined dictionary using sparsity, manifold and difference in mean values of codes formed by applying the initial dictionary to the test features.

4. The method according to claim 1, wherein the dictionary is determined using a sparsity of the formed codes and a manifold of the formed codes.

5. The method according to claim 1, wherein the received dictionary is updated according to training data.

6. The method according to claim 5, wherein the training data is collected from further cameras.

7. The method according to claim 1, wherein the plurality of feature vectors is determined based on pixel properties of pixels in regions of the images.

8. The method according to claim 1, further comprising determining a similarity score between the comparison codes based on the plurality of feature vectors.

9. The method according to claim 8, wherein the similarity score is compared to a fixed threshold.

10. The method according to claim 1, further comprising determining a dissimilarity score between the comparison codes based on the plurality of feature vectors.

11. The method according to claim 1, wherein the images are captured using at least one of an optical sensor, an infrared sensor and a radar sensor.

12. An apparatus to compare objects in images from a target domain, the apparatus comprising:
a receiving unit configure to receive a dictionary determined from a plurality of feature vectors and codes, wherein the plurality of feature vectors was formed from a test image in the target domain, the codes were formed by applying the dictionary to the plurality of feature vectors of the target domain, and the dictionary is based on source domain training data and on a difference in mean values between the formed codes;
a determining unit configure to determine comparison codes for the objects in the images by applying the dictionary to feature vectors of the objects in the images; and
a comparing unit configure to compare the objects in the images based on the comparison codes of the objects.

13. A non-transitory computer-readable medium storing a program to cause a computer to execute a method for an apparatus to compare objects in images from a target domain, the method comprising:
receiving a dictionary determined from a plurality of feature vectors and codes, wherein the plurality of feature vectors was formed from a test image in the target domain, the codes were formed by applying the dictionary to the plurality of feature vectors of the target domain, and the dictionary is based on source domain training data and on a difference in mean values between the formed codes;
determining comparison codes for the objects in the images by applying the dictionary to feature vectors of the objects in the images; and
comparing the objects in the images based on the comparison codes of the objects.

14. A system for comparing objects in images, the system comprising:
a memory for storing data and a computer program; and
a processor coupled to the memory for executing the program, the program comprising instructions for:
receiving a dictionary determined from a plurality of feature vectors and codes, wherein the plurality of feature vectors was formed from a test image in the target domain, the codes were formed by applying the dictionary to the plurality of feature vectors of the target domain, and the dictionary is based on source domain training data and on a difference in mean values between the formed codes,
determining comparison codes for the objects in the images by applying the dictionary to feature vectors of the objects in the image, and comparing the objects in the images based on the comparison codes of the objects.

15. The method according to claim 1, wherein each feature vector is an appearance descriptor that is one of a histogram of colour values and a histogram of quantized image gradient responses.

16. A method for a computer system to compare gallery objects in a first image captured by a first camera and a query object in a second image captured by a second camera, wherein the first camera and the second camera are controlled by the computer system and the gallery objects, and the query object include feature vectors, the method comprising:
   receiving, in the computer system, a dictionary determined in a cloud server as follows:
   collecting target domain training data from the first camera and the second camera during a training phase of operation in advance of capturing the gallery objects and the query object, wherein the collected target domain training data includes training images of objects of a same type as the gallery objects and the query object and was collected without knowledge of the identities of the gallery objects and the query object,
   acquiring pre-exiting source domain training data from sources other than the first camera and the second camera, and
   learning the dictionary on the cloud server based on the target domain training data and the source domain training data;
   determining comparison codes for the gallery objects, and the query object by applying the received dictionary to the feature vectors of the objects in the images; and
   matching objects between the first image and the second image by comparing the comparison codes determined using the received dictionary.

17. The method according to claim 16,
   wherein the gallery objects include a person in a crowd that has been identified as being of particular interest and the query object is a person, and
   wherein images of the target domain are from a set of cameras installed at a customer site and images from the source domain are from publicly available datasets.

* * * * *